United States Patent
Ayoub (10) Patent No.: US 9,677,322 B2
(45) Date of Patent: Jun. 13, 2017

(54) GLASS INSULATING PANEL

(71) Applicant: AGC GLASS EUROPE, Louvain-la-Neuve (BE)

(72) Inventor: Patrick Ayoub, Louvain-la-Neuve (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 0 days.

(21) Appl. No.: 14/441,066

(22) PCT Filed: Oct. 29, 2013

(86) PCT No.: PCT/EP2013/072550
§ 371 (c)(1),
(2) Date: May 6, 2015

(87) PCT Pub. No.: WO2014/072202
PCT Pub. Date: May 15, 2014

(65) Prior Publication Data
US 2015/0300076 A1 Oct. 22, 2015

(30) Foreign Application Priority Data
Nov. 6, 2012 (EP) .................................... 12191354

(51) Int. Cl.
*F21V 3/00* (2015.01)
*E06B 3/663* (2006.01)
(Continued)

(52) U.S. Cl.
CPC .... *E06B 3/66376* (2013.01); *B32B 17/10055* (2013.01); *F21V 11/00* (2013.01)

(58) Field of Classification Search
CPC . E06B 3/66376; B32B 17/10055; F21V 11/00
(Continued)

(56) References Cited

U.S. PATENT DOCUMENTS

| 5,080,146 | A |  | 1/1992 | Arasteh |  |
| 9,250,382 | B2 | * | 2/2016 | Ayoub | ................. G02B 6/0091 |
| 2011/0261090 | A1 |  | 10/2011 | Cordes |  |

FOREIGN PATENT DOCUMENTS

DE 27 07 398 8/1977
DE 10 2008 052 806 4/2010
(Continued)

OTHER PUBLICATIONS

English Translation of EP 0 078 530.*
International Search Report Issued Jan. 22, 2014 in PCT/EP2013/072550 Filed Oct. 29, 2013.

*Primary Examiner* — Anh Mai
*Assistant Examiner* — Hana Featherly
(74) *Attorney, Agent, or Firm* — Oblon, McClelland, Maier & Neustadt, L.L.P.

(57) ABSTRACT

A glass panel (1), comprising: a first glass substrate (101), a second glass substrate (102), a spacer profile (103) at the periphery of the glass panel (1) between the first and the second glass substrate, the spacer being used to maintain an intermediate space (104) between the first and second glass substrates, the panel comprising an intermediate substrate (105) in the intermediate space (104) between the first (101) and the second (102) glass substrates, According to the invention, the panel comprises means to suspend (10711, 10721, 053, 110) the intermediate substrate (105) within the intermediate space (104).

19 Claims, 3 Drawing Sheets

(51) Int. Cl.
*B32B 17/10* (2006.01)
*F21V 11/00* (2015.01)
(58) Field of Classification Search
USPC .................................................. 362/311.01
See application file for complete search history.

(56) References Cited

FOREIGN PATENT DOCUMENTS

| | | |
|---|---|---|
| EP | 0 078 530 | 5/1983 |
| WO | 2012 175139 | 12/2012 |

\* cited by examiner

GLASS INSULATING PANEL

FIELD OF THE INVENTION

This invention relates to glass panels, and to methods of manufacturing the same.

DESCRIPTION OF THE RELATED ART

Glass panels are used in multiple applications such as windows, doors, transparent walls, shelves, show cases for instance in a building and also in vehicles.

A certain type of glass panels that can be particularly interesting for its insulating properties are the multiple glass panels. Such panels comprise several sheet of glass separated by gas filled intermediate space, a spacer profile at the periphery of the glass panel being used to maintain the intermediate spaces between the sheets of glass and a seal (commonly made of butyl) being used to seal the intermediate spaces. The most common multiple glass panels being the double glass panels or double glazings.

Among the glass panels, for instance, the glass lighting panels with integrated light sources such as light emitting diodes (LEDs), are known, e. g. for displaying information, for decoration or for lighting purposes. For these application areas, the manufacturing of a glass panel with electronic components typically comprises the steps of depositing a conductive layer on a first glass substrate, realization of electronic circuits in the conductive layer and depositing of electronic components on the conductive layer, connected to the electronic circuits. In the case of a laminated glass panel, a plastics interlayer is then deposited on the conductive layer and a sandwich is obtained by the application of a second glass substrate on the plastics interlayer, which is then laminated as outlined before. In the case of an insulating glass panel, a second glass substrate is maintained, thanks to a spacer profile deposited at the periphery of the first glass substrate, at a distance from the first glass substrate so as to form an intermediate space between the first and second glass substrates.

In each of these applications it is necessary to furnish an electric supply to the conducting layer for supplying electrical power to the LEDs. EP 1 840 449 describes such a panels of glass embedding LEDs. The LEDs are arranged in a regular grid at 5 cm intervals such that the array of diodes covers substantially the entire area of glazing panel. Each LED has a surface area of about 4 mm$^2$. First and second bus bars extend substantially along the entire length of one edge of the panel between the two glass sheets.

It is also known to use light sources such as light emitting diodes (LEDs) that are arranged to emit light into laminated glass panels along a plane of the panel such as described in WO2010097110A1. In that document, the LEDs are arranged to emit light into the plastic interlayer that is at least partially light diffusive to cause the light to be deflected that cause the glass panel to be illuminated.

It is also known to use LEDs that are arranged to emit light into multiple glazings panels along a plane of the panel such as described in US20080184636A1.

Lighting panels comprising at least one organic glass layer with LEDs that are arranged to emit light into the organic glass layer such as Plexiglas EndLighten sold by EVONIK Industries are also known. In such panel, the organic glass layer is made of Poly(methyl methacrylate) embedding colorless diffuser particles which cause the light to diffuse forwards.

Most of the time, the periphery of the glass panels are embedded in a frame that is used to hide the periphery of the panel (comprising for instance the spacer profile and the seal) but also to attach the glass panel to the part of the building or structure that shall receive it.

The fixation of the frame to the building or structure can be done for example thanks a seal (mortar) material that fills the space between the frame and the surfaces of an opening in which the panel should be integrated or thanks to screws, thanks to glues, Nevertheless, when a panel comprising multiple sheets of glass (organic and/or inorganic) and/or plastics and/or other materials is fixed in a vertical position depending of the material (and more particularly for more flexible materials), the sheet has to have a minimum width (for example 8 mm for a sheet of Plexiglas EndLighten of 1 m×1 m dimensions) in order to avoid buckling. This can be a concern in particular when the weight or the cost (that is closely related to the width of the substrate) of the panel needs to be reduced.

SUMMARY OF THE INVENTION

According to a first aspect, the invention provides:
a glass panel, comprising:
a first glass substrate,
a second glass substrate,
a spacer profile at the periphery of the glass panel between the first and the second glass substrate, the spacer being used to maintain an intermediate space between the first and second glass substrates,
the panel comprising an intermediate substrate in the intermediate space between the first and the second glass substrates.

According to an aspect of the invention, the panel comprises means to suspend the intermediate substrate within the intermediate space.

Embodiments of the invention can have any other features added, some such additional features are set out in dependent claims and described in more detail below.

According to an aspect of the invention, the panel is disposed in a vertical position and the means to suspend the intermediate substrate comprises means to attach a upper portion of the intermediate substrate to a upper portion of the spacer profile.

Therefore, thanks to the fact that the intermediate substrate is suspended in the intermediate space, when the panel is arranged in the vertical position, buckling of the intermediate substrate is prevented whatever the width of the intermediate substrate. Then, smaller width intermediate substrate can be used in order to reduce the weight or cost of the panel.

According to an aspect of the invention, said attachment means comprises:
at least one first opening in said upper portion of the intermediate substrate,
at least one second opening in the upper portion of the spacer profile, and
at least one constant length element which is fixed to both said first and second openings.

According to an aspect of the invention, said spacer profile comprises:
means to maintain the intermediate substrate in the intermediate space between the first and the second glass substrates.

According to an aspect of the invention, said means to maintain the intermediate substrate in the intermediate space comprises a first and a second parallel wings extending along at least a portion of the length of the intermediate organic glass substrate, the first and second wings being arranged to lodge at least a portion of the edges of the intermediate organic glass substrate.

According to an aspect of the invention, said the upper portion of the spacer profile comprises at least a second opening in each of the first and a second parallel wings, in that said first opening and second openings are all disposed in regard and in that said constant length element is a stem that is inserted in both the first and second openings.

According to an aspect of the invention, the intermediate substrate is an intermediate organic glass substrate.

According to an aspect of the invention, the panel comprises at least one light source.

According to an aspect of the invention, the spacer profile comprises:

means to lodge the at least one light source so as the at least one light source emits light into the intermediate organic glass substrate predominantly along a plane of the panel.

According to an aspect of the invention, at least part of the intermediate organic glass substrate is arranged to deflect the light out of the plane of the panel and through at least one of the first and second glass substrates to provide a diffused light output.

By having the light deflected by the organic glass substrate, it can be spread or diffused more widely to reduce problems caused by more direct illumination from point sources.

By having the intermediate organic glass substrate arranged between a first and a second glass substrates, the organic glass substrate is then protected against any risk of the occurrence of defaults such as scratches and/or stripes on its surface. And then local refraction of the light beam propagating through defaults in the panel are avoided. Then, the uniformity of the light generated at the surface of panel and the overall aesthetics of the illuminated panel are improved or are kept.

In the following, the expression default encompasses all kind of surface default such as scratches, stripes, protrusion, roughness, striates, projections, slits, puncture, groove, depression, . . . . The defaults can be microscopic. The defaults can be macroscopic.

According to another aspect of the invention, the spacer profile also comprises means to dissipate heat generated by the at least one light source.

According to another aspect of the invention, the means to dissipate heat comprise a radiator embedded in the spacer.

Then, by having means to dissipate heat embedded in the spacer, the invention allows for a better dissipation of heat generated by the light source(s) and then allows to embed in the panel higher densities of light sources and/or higher power light source(s). As a matter of fact, for a good and efficient functioning of most of the light sources (such as LEDs for instance), temperature in the environment around the light sources shall be controlled to be inferior to a temperature threshold (above which the light source intensity or efficiency starts to decrease). Most of the light sources generate heat when functioning due to their electric powering. The higher the electrical power supplied to the light source, the more heat is generated. Moreover, the higher the density of light sources in an environment, the more heat is generated in that environment. As a matter of fact, preliminary test have shown that, in such glass lighting panel where the light sources are LEDs, the ambient temperature of the LEDs can be up to 60° C., which greatly reduces their lifetime. Therefore, the heat dissipating means are very important particularly when high light output is required.

A solution to limit/avoid the temperature increase due to electrical powering of the light sources is to dissipate generated heat.

According to another aspect of the invention, the means to lodge at least one light source comprises at least a housing being arranged between the first and the second wings so as to face an edge of the intermediate organic glass substrate.

According to another aspect of the invention, the intermediate organic glass substrate is at least partially light diffusive to cause the light to be deflected.

According to another aspect of the invention, the intermediate organic glass substrate is a Poly(methyl methacrylate) layer.

According to another aspect of the invention, the intermediate organic glass substrate is a Poly(methyl methacrylate) layer embedding colorless diffuser particles which cause the light to diffuse forwards.

Another aspect provides a spacer profile for maintaining an intermediate space between a first glass substrate and a second glass substrate of a glass lighting panel, the spacer profile being positioned at the periphery of the glass panel between the first and the second glass substrate, the spacer profile comprising:

means to maintain an intermediate substrate in the intermediate space between the first and the second glass substrates and means to lodge at least one light source so as the at least one light source is arranged to emit light into the intermediate substrate predominantly along a plane of the panel.

According to another aspect of the invention, the spacer profile also comprises means to dissipate heat.

According to another aspect of the invention, the means to dissipate heat comprise a radiator embedded in the spacer.

According to another aspect of the invention, the means to maintain an intermediate substrate in the intermediate space comprises a first and a second parallel wings extending along at least a portion of the length of the intermediate substrate, the first and second wings being arranged to lodge at least a portion of the edges of the intermediate substrate.

According to another aspect of the invention, the means to lodge at least one light source comprises at least a housing being arranged between the first and the second wings.

Another aspect provides a method of manufacturing a glass lighting panel comprising a first glass substrate and a second glass substrate, comprising the following step:

providing a spacer profile at the periphery of the glass panel between the first and the second glass substrate to maintain an intermediate space between the first and second glass substrates.

According to an aspect of the invention, the method also comprises the following steps:

maintaining, thanks to the spacer profile, an intermediate organic glass substrate in the intermediate space between the first and the second glass substrates, lodging, thanks to the spacer profile, at least one light source so as the at least one light source emits light into the intermediate organic glass substrate predominantly along a plane of the panel, arranging at least part of the intermediate organic glass substrate to deflect the light out of the plane of the panel and through at least one of the first and second glass substrates to provide a diffused light output.

Any of the additional features can be combined together and combined with any of the aspects. Other advantages will be apparent to those skilled in the art, especially over other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which.

DESCRIPTION OF THE PREFERRED EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

The invention will now be described by a detailed description of several embodiments of the invention. It is clear that other embodiments of the invention can be configured according to the knowledge of persons skilled in the art without departing from the technical teaching of the invention, the invention being limited only by the terms of the appended claims.

Introduction to Some Embodiments

Some of the features described below arise from an appreciation that panel comprising at least two sheets of glass embedding an intermediate substrate e.g. made of inorganic glass and/or plastics and/or other materials is fixed in a vertical position depending of the material (and more particularly for more flexible materials), the intermediate substrate has to have a minimum width in order to avoid buckling. This can be a concern in particular when the weight of the panel needs to be reduced.

Thus an objective of at least some of the embodiments is to provide a panel of glass comprising an intermediate substrate in which the intermediate substrate can have any and all widths without buckling of the intermediate substrate.

Thus an objective of at least some of the embodiments is to provide a panel of glass comprising an intermediate substrate the weight of which can be reduced.

Some other of the features described below arise from an appreciation that the surfaces of an organic glass substrate are highly sensitive to defaults such as scratches and/or stripes and/or protrusions and then, if default are present on the surface of such a substrate, light generated on the surface of such a substrate is not perfectly uniform and the overall aesthetics of the panel is decreased.

Thus an objective of at least some of the embodiments is to provide a panel of glass including at least one light source which provides surface lighting with an improved uniformity. Another objective of some embodiments is to provide such a surface lighting panel in which the aesthetics of the panel is improved. Another objective of at least some embodiments is to provide such a surface lighting panel which allows to embed in the panel higher densities of light sources and/or higher power light source(s).

Some embodiments involve a glass lighting panel, comprising a first glass substrate an intermediate organic glass substrate, a second glass substrate and a spacer profile at the periphery of the glass panel between the first and the second glass substrates, the spacer being used to maintain an intermediate space between the first and the second glass substrate. The glass substrates can encompass glass equivalents such as hard plastic or Perspex acrylic or polycarbonate materials. The panel can have at least one light source lodged in the spacer profile so as to emit light into the intermediate organic glass substrate predominantly along a plane of the panel.

The organic glass layer can be arranged to be at least partially light diffusive such that light emitted by the at least one light source is deflected out of the plane of the panel and through the surfaces of at least one of the glass substrates. This can be made partially diffusive by choice of properties of the material, by adding particles (e.g. colorless or colored diffuser particles), by adding any kind of reflective or partially reflective structures, or by surface treatments to hinder total internal reflection and so on. The panel according to the invention can be flat and be for instance a building window or door, a partition wall for indoor or outdoor architectural applications, a display panel (e.g. for advertising), a road sign, . . . .

Nevertheless, the panel need not be flat, it can be formed to have a curved main surface for instance, the panel can be a vehicle glazing.

Additional Features:

Some additional features of some of the embodiments are as follows.

In some cases at least one light source such as an LED, OLED etc. can be embedded in the spacer profile (in lodging means of the spacer profile) at the periphery of the glass panel in order to emit light into the intermediate organic glass substrate (preferentially at the edge of the intermediate organic glass substrate) in a direction predominantly included in the plane of the panel.

According to a first aspect of the invention, only one light source can be lodged in the spacer profile in order to emit light into the intermediate organic glass substrate. It can be lodged everywhere in the spacer profile and emit light in every portion of the edges of the intermediate organic glass substrate.

Clearly according to other aspects of the invention, two, three, four, or any other quantity of light sources can be lodged everywhere in the spacer profile so as to emit light into the intermediate organic glass substrate. In case of a perpendicular panel comprising a perpendicular intermediate organic glass substrate comprising four edges, the light sources can be lodged in the spacer profile so as to emit in any portion of any edge of the intermediate organic glass substrate. The light sources can also be lodged in the spacer on a regular basis so as to emit light on a regular basis in the four edges of the intermediate organic glass substrate.

Any kind of light source that can be embedded in the spacer profile can be implemented in the present invention such as LED, OLED, laser diodes, fluorescent tube, fluorescent lamp, . . . .

Figure 1:
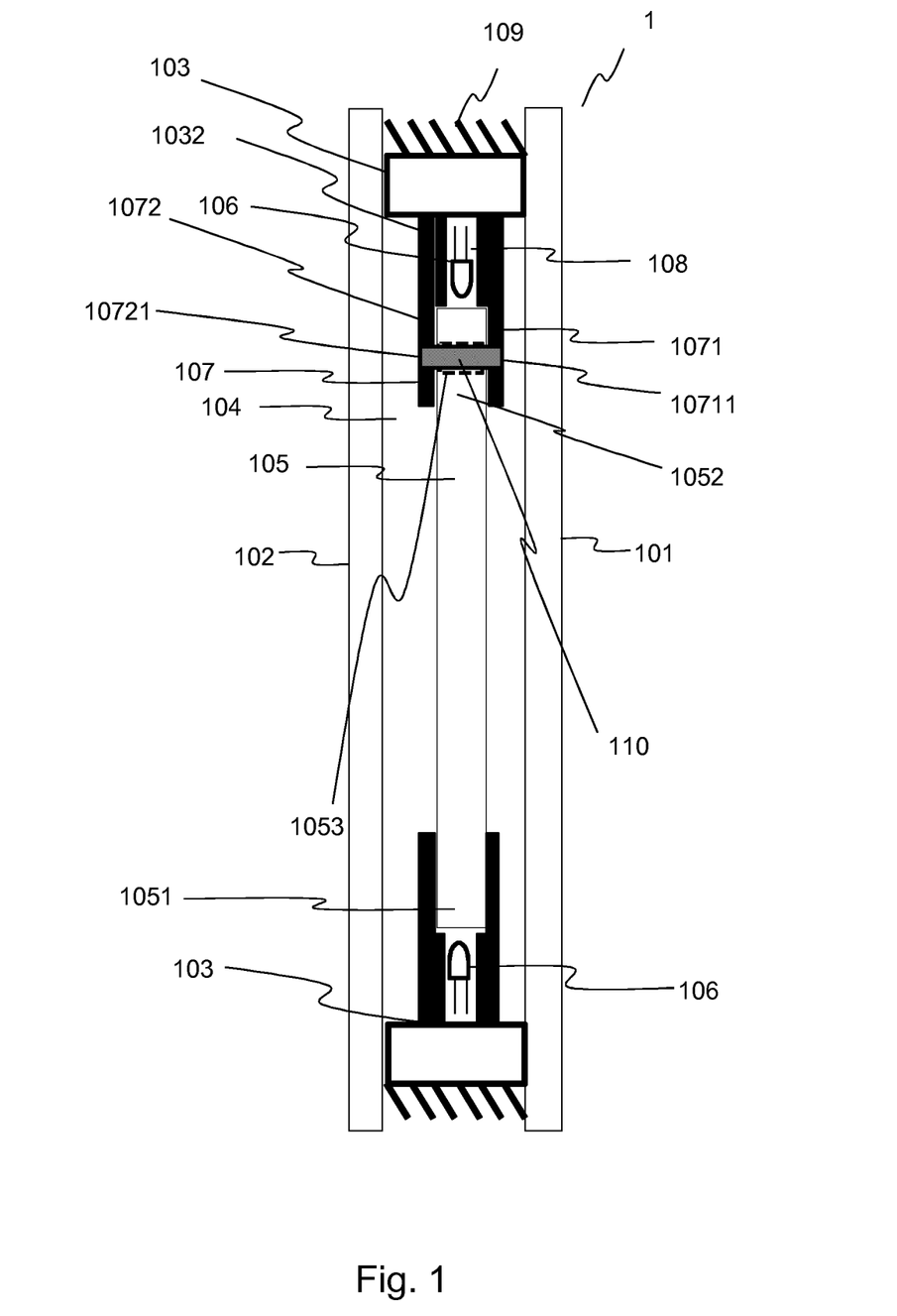
FIG. 1 shows a cross section view a portion of a panel according to a particular embodiment according to which the light sources are LEDs that are arranged at the periphery of the glass panel in order to emit light in a direction along the plane of the glass substrates.
Figure 2:
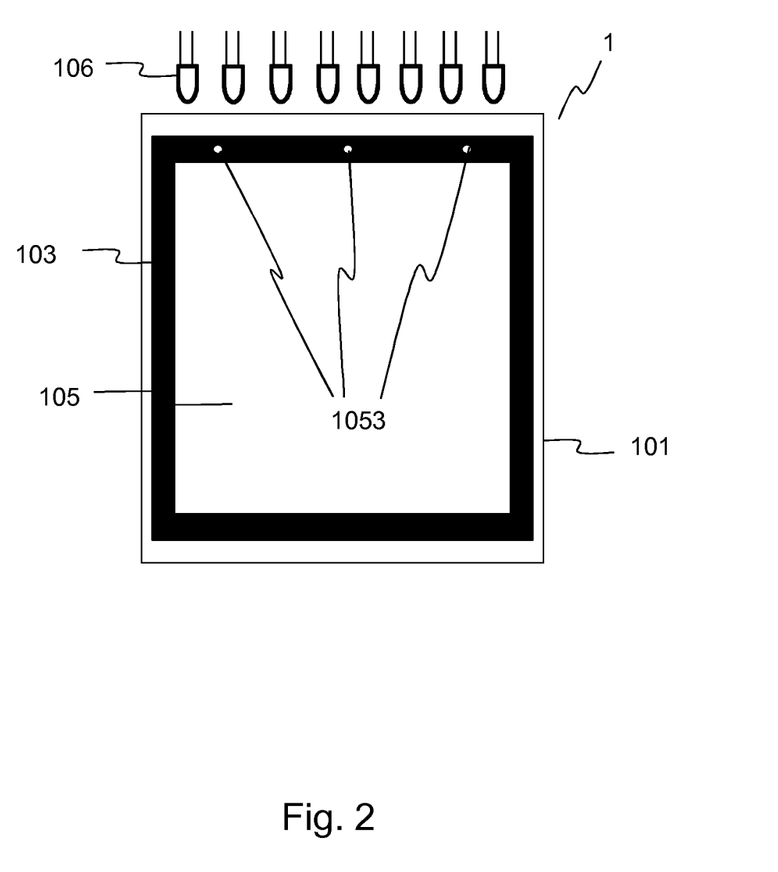
FIG. 2 shows a top view of FIG. 1 embodiment.

FIGS. 1 and 2—A First Embodiment

FIG. 1 shows a portion of a cross section view and FIG. 2 shows a top view of a glass lighting panel 1 according to a particular embodiment of the invention.

The glass lighting panel 1 comprises a first glass plate or substrate (or sheet) 101, an intermediate substrate 105 that is for example an intermediate organic glass substrate 105, a second glass plate or substrate (or sheet) 102, a plurality of LEDs 106 and a spacer profile 103 at the periphery of the glass panel 1 between the first 101 and the second 102 glass substrates, the spacer 103 being used to maintain an intermediate space 104 (or cavity) between the first and the second glass substrates.

Preferentially, the spacer profile 103 comprises:
  means 107 to maintain the intermediate organic glass substrate 105 in the intermediate space 104, and
  means 108 to lodge the LEDs 106 so that they emit light into the intermediate organic glass substrate 105 predominantly along a plane of the panel.

Preferentially, the means 107 to maintain the intermediate organic glass substrate 105 in the intermediate space 104 comprises a first 1071 and a second 1072 parallel wings extending along at least a portion of the length of the intermediate organic glass substrate 105, the first and second wings being arranged to lodge at least a portion 1051 of the edges of the intermediate organic glass substrate 105.

Preferentially, the means 108 to lodge the LEDs 106 comprises, for each LED 106, a housing 108 that is arranged between the first 1071 and the second 1072 wings so as to face an edge 1051 of the intermediate organic glass substrate 105.

The spacer profile 103 can be made from any suitable material such as alumina, stainless steel, plastic, and many other materials.

Preferentially, the spacer profile 103 also comprises means 109 to dissipate heat generated by the LEDs 106. Preferentially, the means to dissipate heat comprise a radiator 109 embedded in the spacer. Preferentially, the spacer profile is made from a heat conducting material such as a metal (e.g. alumina, stainless steel, . . . or combination thereof) or and the radiator 109 is made by realizing wings on the edge of the spacer profile 103 that is in contact with the external atmosphere (external edge of the spacer).

Preferentially, the panel comprises means to suspend the intermediate inorganic glass substrate 105 within the intermediate space 104.

Preferentially, the panel is disposed in a vertical position (for example it is the case when the panel is used as a window, or a door, or a separation wall or a vertical part of a show case, . . . ) and the means to suspend the intermediate inorganic glass substrate 105 comprises means to attach a upper portion 1052 of the intermediate substrate 105 to a upper portion 1032 of the spacer profile 103.

For instance, if the intermediate inorganic glass substrate 105 is rectangular and therefore comprises an upper edge 1051, two lateral edges 1051 and a bottom edge 1051, then said upper portion 1052 is preferentially the upper edge of the intermediate substrate 105.

In the same manner, if the spacer profile 103 is rectangular (according to the geometry of the first and second glass substrate and intermediate substrate) and therefore comprises an upper part 1031, two lateral parts and a bottom part, then said upper portion 1031 is said upper part.

Said attachment means comprises:

at least one first opening 1053 in said upper portion 1052 of the intermediate inorganic glass substrate 105, at least one second opening 10711, 10721 in the upper portion 1032 of the spacer profile 103, and at least one constant length element 110 which is fixed to both said first 1053 and second openings.

Preferentially, said the upper portion 1032 of the spacer profile 103 comprises at least a second opening 10711, 10721 in each of the first 1071 and a second 1072 parallel wings, in that said first opening 1053 and second openings 10711, 10721 are all disposed in regard and in that said constant length element 110 is a stem (that can be a pin, a rivet, or any other stem) that is inserted in both the first 1053 and second 10711, 10721 openings.

For instance, as illustrated by FIG. 2, the upper portion (or edge) 1052 of the intermediate inorganic glass substrate 105 comprises three openings (e.g. holes of 3 to 40 mm diameter) 1053 and the upper portion 1032 of the spacer profile 103 therefore comprises three pairs of first 10711 and second 10721 openings (e.g. holes) respectively in the first 1071 and a second 1072 parallel wings. In that case, three stems 110 are used.

Preferentially, the stem is fixed to the openings thanks to any suitable piece (such as a thanks to two nuts that are screwed to both threaded parts of the stem that exceed from both said first and second wings) or material (such as glue) or is inserted under pressure (or pressed) in the openings.

Preferentially, the openings and the stem have a circular section. Nevertheless, any other geometry of the section can be used such as a square or rectangular section for instance.

For example, each of said openings is a circular section opening of 1 cm diameter and each of said stems is a 1 cm diameter section stainless steel stem. For example, the stems are inserted under pressure (or pressed) in the openings.

For example, the openings 1053 in the intermediate inorganic glass substrate 105 and the first 10711 and second 10721 openings respectively in the first 1071 and a second 1072 parallel wings are obtained thanks to a drilling machine equipped with a stainless steel drill.

Preferentially, and as illustrated on FIG. 2, the LEDs 106 are disposed so as not to face any of the openings 1053 of the upper portion 1052 of the intermediate inorganic glass substrate 105. As a matter of fact, in that case, more light is fed into the intermediate inorganic glass substrate 105.

Preferentially, at the level of the two lateral parts and a bottom part of the spacer profile 103, the means 107 to maintain the intermediate substrate 105 in the intermediate space 104 are just used to guide the intermediate substrate 105 and let a certain degree of liberty in all the directions. It can be obtained by choosing a spacing between the first and the second wing that is higher than the width of the intermediate substrate 105 for the two lateral parts and a bottom part of the spacer profile 103.

On FIG. 1, the spacer is represented has having a hollow rectangular section, obviously, for better heat dissipation performances, the spacer can have a more bulky rectangular section.

According to the present particular embodiment, the glass lighting panel 1 is an rectangular insulating multiple glazing panel embedding a rectangular intermediate organic glass substrate. The intermediate space or cavity 104 can be filled with a gas such as air or any insulating gas, e.g. Argon, Krypton, Xenon, SF6, CO2, . . . or any combination of the previously mentioned gas. A sealant, e.g. a butyl coating, can be provided between the spacer and the internal surface (surface of the substrate that is in contact with the intermediate space 104) of the first and second glass substrate to seal the panel and avoid the gas to leave the cavity 104. Alternatively, a vacuum can be created in the intermediate space or cavity 104. Preferentially, the spacer profile 103 is filled with or contain desiccant to remove moisture trapped in the gas space during manufacturing of the panel 1.

According to the present particular embodiment, the spacer profile each LED 106 is lodged in a housing 108 of the spacer profile on a regular basis so as to emit light on a regular basis in the four edges of the intermediate organic glass substrate 105. FIG. 2 illustrates on strip of LEDs 106 down one edge of the rectangular laminated glass panel 1, but, according to the present particular embodiment, the three other edges of the panel are provided with LEDs 106. For instance, the LEDs 106 are provided as a flexible adhesive strip, for instance, a LED strip sold by OSRAM with the reference LF06P-W4F-854 or VISTAR VFS-N3528-120W-L1, in order to be glued (e.g. with an adhesive tape) in the housing 108 of the spacer profile 103.

In order to supply power to the LEDs, for instance, a hole is drilled in the edge of the spacer profile 103 and a cable is inserted through a protective tubular shaped polymer material. This tube protects the cable from the edges of the drilled (sharp) alumina. The cable is then soldered on adequate connection pad(s) of the flexible adhesive LED strip.

At least part of the intermediate organic glass substrate 105 is arranged to deflect the light out of the plane of the panel and through at least one of the first and second glass substrates to provide a diffused light output. Preferentially, it is at least partially light diffusive to cause the light to be deflected.

For instance, the organic glass substrate is a Poly(methyl methacrylate) layer and more particularly a Poly(methyl methacrylate) (hereafter referenced PMMA) layer embedding colorless diffuser particles which cause the light to diffuse forwards. For instance, the organic glass substrate has a width that is comprised between 2 mm to 6 mm or even lower. Such thin organic glass substrates can be used due to the fact that said substrate is suspended and then no buckling occurs. For instance, the organic glass layer is a layer of Plexiglas Endlighten T, Grade number 0N001, 8 mm thickness that is sold by the company EVONIK Industries. The refractive index of this PMMA is 1.491 measured using ISO 489. According to another embodiment, the organic glass layer embeds particles only on a part of its volume, for instance only in a central part of that substrate. Different particle concentrations can be used and can be adapted to the dimensions of the glass panel 1.

The glass of the first and second glass substrates can be coated, tinted, tempered or bended or a combination of these. In this example 50 cm*30 cm sheets with a thickness of 2.1 mm can be considered, though other dimensions can be used according to the application. For instance, the LEDs 106 are provided as a LED strip sold by OSRAM with the reference LF06P-W4F-854 or VISTAR VFS-N3528-120W-L1.

Then, thanks to the presence of the diffuser particles in the intermediate organic glass substrate 105, the organic glass substrate 105 cause the light emitted by the light sources (LEDs 106) to diffuse forward and then deflects the light emitted by the LEDs 106 out of the plane of the panel 1 and through the first and second glass substrates to provide a diffused light output.

Basic methods for assembling/manufacturing glass, without the novel features of the present invention, for use in this and other embodiments are well-known in the window/double glazing industry.

Figure 3:
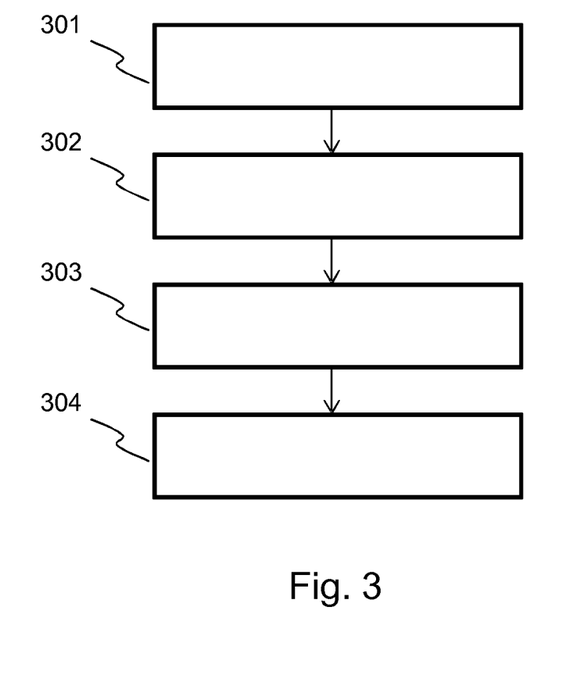
FIG. 3 illustrates the main steps of a method of manufacturing of the glass lighting panel of FIG. 1.

According to a present particular embodiment, a method of manufacturing of the glass lighting panel 1 comprising the first glass substrate 101 and the second glass substrate 102, is illustrated on FIG. 3 and comprises the following step:

providing 301 the spacer profile 103 at the periphery of the glass panel between the first and the second glass substrate to maintain the intermediate space 104 between the first and second glass substrates, maintaining 302, thanks to the spacer profile, an intermediate organic glass substrate 105 in the intermediate space between the first and the second glass substrates, lodging 303, thanks to the spacer profile, the LEDs 106 so as they emit light into the intermediate organic glass substrate predominantly along a plane of the panel, arranging 304 at least part of the intermediate organic glass substrate 105 to deflect the light out of the plane of the panel and through at least one of the first and second glass substrates to provide a diffused light output.

Other Embodiments

In some cases one or both the first and second glass substrates can be flat soda lime glass, notably float glass. One or both of the first and second glass substrates may be clear glass, extra clear glass or body tinted glass. Particularly when intended for use in window applications, the glazing panel may be substantially transparent. In this case, it may have a light transmission (CIE Illuminant C) of greater than or equal to 40%, 50%, 60% or 70% and/or a level of haze of less than or equally to 5%, 3% or 2% for example. Particularly when intended for decoration and/or lighting purposes, it may be unnecessary and/or undesired for the panel to be substantially transparent. In this case, it may have a light transmission (CIE Illuminant C) of less than or equal to 20%, 10%, or 5% and/or a level of haze of greater than or equally to 30%, 40% or 50%.

Examples of additives to make the organic glass layer diffusive can encompass inorganic particles of glass, silica, mica, synthetic mica, calcium carbonate, barium sulfate, talc, montmorillonite, kaolin clay, bentonite, hectorite, etc., metal oxide particles of titanium oxide, zinc oxide, tin oxide, alumina, etc., or organic polymer particles of acrylic beads, styrene beads, benzoguanamine, silicone, etc. A haze value when the diffusing material is added is preferably not lower than 10% but not greater than 99%. If it is lower than 10%, a sufficient light scattering effect may not be obtained, and if it is greater than 99%, the light transmission characteristics degrade, greatly reducing the amount of emergent light.

More diffusion can be obtained by surface roughening of a light-emitting face accomplished by cutting using a saw or an automatic cutter (for example, an NC router) or by blasting, surface grinding using a grinder, emboss forming, etc. In the case of blasting, particles are applied using a high-speed blasting machine over the surface of the organic glass layer, the interlayers or the glass substrates to form random projections and depressions, and the thus formed surface can be used as the light-emitting face. In the case of grinding, a grinder using, for example, a file is used to grind the surface.

The light sources can be colored, and optionally arranged so that there is color mixing to achieve a uniform white. The relative levels of the colors can be controlled to control the color temperature if desired. The panels can be incorporated into buildings, windows, mirrors, backlights for display systems and so on. Arrays of the panels can be built up to illuminate larger areas.

Other variations can be envisaged within the scope of the claims.

The invention claimed is:

1. A glass panel, comprising:
a first glass substrate,
a second glass substrate,
a spacer profile at a periphery of the glass panel between the first and the second glass substrate, the spacer profile being configured to maintain an intermediate space between the first and second glass substrates,
the panel comprising an intermediate organic glass substrate in the intermediate space between the first and the second glass substrates,
wherein the panel comprises means to suspend the intermediate organic glass substrate within the intermediate space,
wherein the panel is disposed in a vertical position and the means to suspend the intermediate organic glass substrate comprises means to attach an upper portion of the intermediate substrate to an upper portion of the spacer profile,
wherein the attachment means comprises a first opening in the upper portion of the intermediate organic glass substrate, a second opening in the upper portion of the spacer profile, and a constant length element which is fixed to both the first and second openings,
wherein the spacer profile comprises means to maintain the intermediate organic glass substrate in the intermediate space between the first and the second glass substrates, and
wherein the means to maintain the intermediate organic glass substrate in the intermediate space comprises first and second parallel wings extending along at least a portion of a length of the intermediate organic glass substrate, the first and second wings being arranged to lodge at least a portion of edges of the intermediate organic glass substrate.

2. The glass panel according to claim 1, wherein the upper portion of the spacer profile comprises at least one second opening in each of first and second parallel wings, wherein the first opening and second openings are all disposed opposite each other and in that the constant length element is a stem that is inserted in both the first and second openings.

3. The glass panel of claim 1, wherein the the panel comprises a light source, and wherein the spacer profile further comprises:
means to lodge the light source so as the light source emits light into the intermediate organic glass substrate predominantly along a plane of the panel,
and at least part of the intermediate organic glass substrate is arranged to deflect the light out of the plane of the panel and through at least one of the first and second glass substrates to provide a diffused light output.

4. The glass panel of claim 3, wherein the means to lodge the light source comprises at least a housing being arranged between the first and the second wings so as to face an edge of the intermediate organic glass substrate.

5. The glass panel of claim 3, wherein the intermediate organic glass substrate is at least partially light diffusive to cause the light to be deflected.

6. The glass panel of claim 3, wherein the intermediate organic glass substrate is a Poly(methyl methacrylate) layer.

7. The glass panel of claim 6, wherein the intermediate organic glass substrate is a Poly(methyl methacrylate) layer embedding colorless diffuser particles which cause the light to diffuse out of the plane of the panel.

8. The glass panel of claim 3, wherein the light source comprises LEDs.

9. A glass panel, comprising:
a first glass substrate;
a second glass substrate;
a spacer profile at a periphery of the glass panel between the first and the second glass substrate, the spacer profile being configured to maintain an intermediate space between the first and second glass substrates; and
an intermediate substrate in the intermediate space between the first and the second glass substrates,
wherein the spacer profile comprises first and a second parallel wings extending along at least a portion of the length of the intermediate substrate, the first and second wings being arranged to lodge at least a portion of the edges of the intermediate substrate and suspend the intermediate substrate within the intermediate space.

10. The glass panel according to claim 9, wherein the panel is disposed in a vertical position and an upper portion of the intermediate substrate is attached to an upper portion of the spacer profile.

11. The glass panel according to claim 10, further comprising:

a first opening in the upper portion of the intermediate substrate;
a second opening in the upper portion of the spacer profile; and
a constant length element fixed to both the first and second openings.

12. The glass panel according to claim 11, wherein the upper portion of the spacer profile comprises at least one second opening in each of the first and second parallel wings, and wherein the constant length element is a stem that is inserted in both the first and second openings.

13. The glass panel of claim 9, wherein the intermediate substrate is an intermediate organic glass substrate.

14. The glass panel of claim 13, further comprising:
a light source that emits light into the intermediate organic glass substrate along a plane of the panel, and
wherein at least part of the intermediate organic glass substrate is arranged to deflect the light out of a plane of the panel and through at least one of the first and second glass substrates to provide a diffused light output.

15. The glass panel of claim 14, further comprising:
a housing to lodge the light source, the housing arranged between the first and the second wings so as to face an edge of the intermediate organic glass substrate.

16. The glass panel of claim 14, wherein the light source comprises LEDs.

17. The glass panel of claim 13, wherein the intermediate organic glass substrate is at least partially light diffusive.

18. The glass panel of claim 13, wherein the intermediate organic glass substrate is a Poly(methyl methacrylate) layer.

19. The glass panel of claim 13, wherein the intermediate organic glass substrate is a Poly(methyl methacrylate) layer embedding colorless diffuser particles which cause the light to diffuse out of a plane of the panel.

* * * * *